US007206183B2

(12) United States Patent
Sikes et al.

(10) Patent No.: US 7,206,183 B2
(45) Date of Patent: Apr. 17, 2007

(54) ENHANCED NON-LETHAL ELECTRIC WEAPON

(75) Inventors: William J. Sikes, Jacksonville, FL (US); Ara Manukian, Gainesville, FL (US)

(73) Assignee: Millennium Dynamics, Inc., Jacksonville, FL (US)

(*) Notice: Subject to any disclaimer, the term of this patent is extended or adjusted under 35 U.S.C. 154(b) by 362 days.

(21) Appl. No.: 10/750,539

(22) Filed: Dec. 30, 2003

(65) Prior Publication Data

US 2004/0264099 A1 Dec. 30, 2004

Related U.S. Application Data

(60) Provisional application No. 60/437,680, filed on Dec. 31, 2002.

(51) Int. Cl.
*H02H 1/00* (2006.01)

(52) U.S. Cl. .......................................... 361/232

(58) Field of Classification Search ................. 361/232
See application file for complete search history.

(56) References Cited

U.S. PATENT DOCUMENTS 1,046,985 A * 12/1912 Creedon ..................... 607/150
1,915,721 A * 6/1933 Diaz .......................... 361/232
2,155,331 A * 4/1939 Sadloski ...................... 405/186
3,885,576 A * 5/1975 Symmes ..................... 131/270
4,337,496 A * 6/1982 Laird ......................... 361/232
4,486,807 A * 12/1984 Yanez ........................ 361/232
5,158,039 A * 10/1992 Clark ......................... 119/712
6,010,473 A * 1/2000 Robinson ..................... 602/21
6,961,227 B1 * 11/2005 Whiton et al. .............. 361/232

* cited by examiner

*Primary Examiner*—Brian Sircus
*Assistant Examiner*—Boris Benenson
(74) *Attorney, Agent, or Firm*—Timothy H. Van Dyke; Beusse Wolter Sanks Mora & Maire

(57) ABSTRACT

A multi-component device which is capable of delivering a non-lethal, high-voltage electric shock which can incapacitate a person or animal that is worn as an ordinary article of apparel (clothing) by a person for use as a defensive or offensive weapon that is not distinguishable or identifiable as a weapon. The types of apparel used as this device are regular clothing items such as pants, jackets, vests, shoes and gloves, all of which contain internal high voltage electrodes and wiring, a unique pressure sensitive activation switch, and a separate control unit that is attached to a belt or placed in a pocket which is connected to the clothing item by a separate multiconductor electrical wiring harness. The device is activated by physical contact with target subject.

12 Claims, 7 Drawing Sheets

FIGURE 4(A)
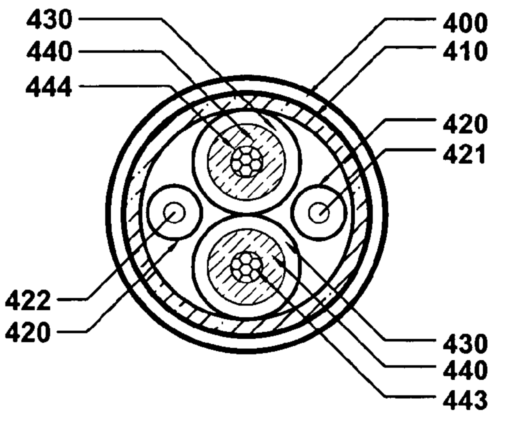
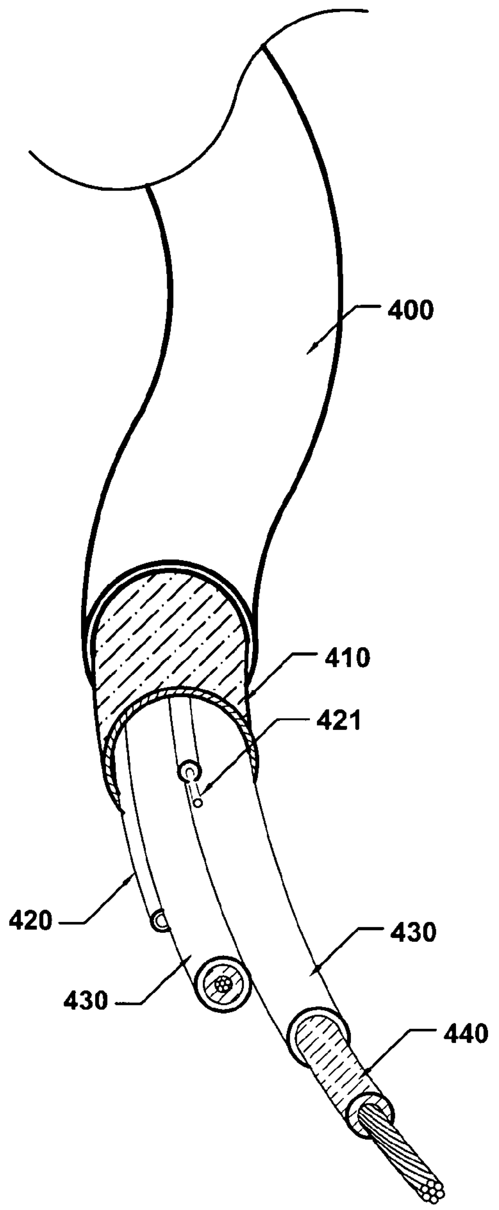
FIGURE 4(B)
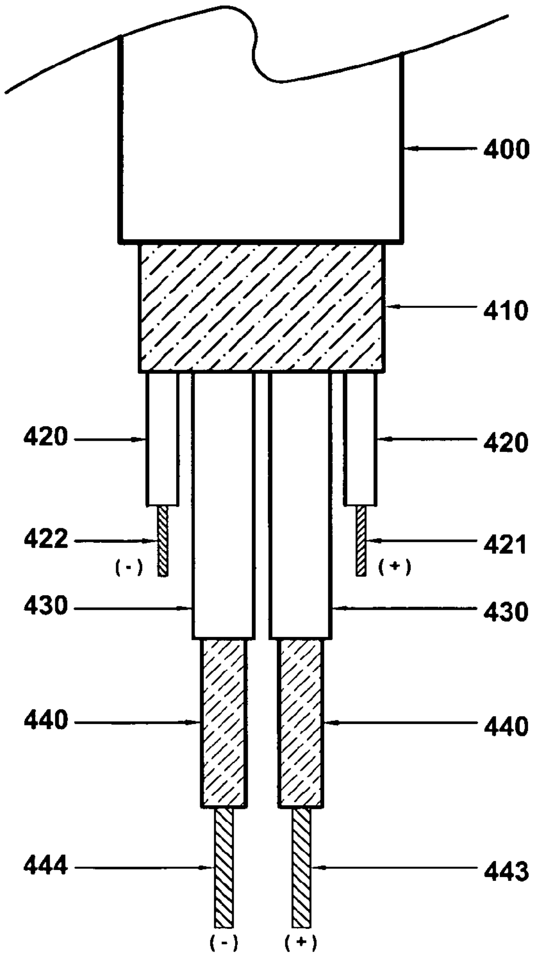
FIGURE 4(C)

ENHANCED NON-LETHAL ELECTRIC WEAPON

CROSS-REFERENCE TO RELATED APPLICATIONS

This application is related to U.S. Provisional Application 60/437,680 filed on Dec. 31, 2002 and claims priority to such application under 35 USC § 119(e).

BACKGROUND OF THE INVENTION

The term "non-lethal force" as used in this application refers to the amount of applied force that is sufficient enough to temporarily incapacitate a human or other animal in such a way that will render the subject incapable of harming another individual (or animal) or stopping his or hers (or its) actions long enough to gain control of the subject without killing or causing permanent or serious bodily harm to that subject.

The term "Stun-Gun" has been used to describe many types of non-lethal force weapons used in controlling humans and other animals. Stun-guns or stun-devices in general can utilize different types of applied forces to incapacitate subjects and typically utilize, but are not limited to: mechanical, chemical, and electric force that is used to temporarily paralyze, immobilize or restrict a subject.

Typical methods of operation of common stun-guns or stun-devices include: the delivery of a powerful mechanical blow to a subject by projecting a heavy mass such as a small "bean-bag" containing lead shot, or a metal baton that is discharged by a gun at a high velocity or by a spring loaded device; the delivery of a chemical agent in liquid or gaseous form released from a pressurized container or projectile in such a way that the subject is forced to inhale the chemical agent or have it absorbed through the skin which then causes extreme discomfort, irritation or paralyzation; the delivery of a high-voltage, low-amperage electrical shock by direct contact with electrodes that are attached to a hand-held device or that can be projected by a gun with connecting wires to the electrodes.

The stun-guns or stun-devices that fall in the same field-of-use and are related to this subject invention are those devices that utilize only electrical force to incapacitate a subject by the application of a high-voltage, low-amperage electrical shock or signal to a subject by physical contact with electrical electrodes. These include all such electrical devices that are hand-held or physically attached to a person or animal by means of a belt or other restraint, or those electrical devices that project electrodes at a target by any means. Several such devices currently exist and are commercially available (see patent reference listing); however, each of those devices are uniquely different in construction, materials and method of operation to the invention described in this patent application.

Conventionalhand-held stun-gun devices and stun-batons or probes (such as shock prods, truncheons, umbrellas and cattle-prods) are completely self-contained units assembled in a single housing which contain a power supply (batteries), a high-voltage generator circuit and electrodes for delivery of the electrical shock by physical contact with the electrodes. The operator of such devices must hold the unit by hand, then manually turn it on by some switch mechanism, then approach and make contact with the target subject on the electrode end of the device. One of the main drawbacks or problems with such hand-held devices is that they can be easily removed from the user by knocking it away, grabbing it or by hitting the person and causing them to release the weapon. Once that occurs, the device can be picked up by the target subject and be turned against the original user, rendering him or her incapacitated. Additional drawbacks of these devices include; their method of use does not make them easily conceal-able or "stealthy" prior to their immediate use. These devices must be held openly in the users hand prior to discharge and requires them to be pointed in the direction of the target to make contact; thereby possibly warning the target subject of an impending shock, providing a brief opportunity for the target subject to counteract the user's attempt to deliver a shock or escape away; these devices are also not instantly available for immediate use and must be deployed prior to use. The operator must plan and anticipate the use of the device prior to actually discharging the weapon. All these hand-held devices must be taken out of a pocket, removed from a holster, sheath, or purse and turned on before use. This is a major problem when the user or owner of the device is not anticipating its sudden use such as in a surprise attack from behind, and then cannot respond fast enough to thwart off the attacker; and finally, should a user get into a fight prior to deciding to use such a device as a last result, the opportunity to deploy the weapon may not be possible if the attacker grabs the victim (device user) around the arms in a wrestling hold or similar "bear-hug" maneuver preventing him or her from lifting their arms to reach for the stun-device.

Electric stun-devices that are attached to a target subject such as the "Belt-type Electric Shock Device" described in U.S. Pat. No. 5,153,365 used to control prisoners or other already restrained individuals, and those used to control animals such as "Electric Shock Collars" used on dogs and other animals for training and boundary containment (invisible fences) are typically two component devices that are remotely activated by some form of wireless communication at a distance from the subject target. These devices are not usually considered true-weapons (defensive or offensive) since they cannot be used at any time to subdue an unknown or surprise attacker, but rather require them to be attached directly onto an already controllable and restraint subject prior to their use, and are considered more of a preventative, restraining, or training control device.

Electric stun-gun devices that "shoot" or project out electrodes to incapacitate a person or animal currently exist and are commercially available (such as the "TASER", Taser International, Inc.)). These allow the user of such devices to deliver a non-lethal electric shock at a safe distance without having to physically contact an individual. The single advantage that these type of systems have over other electrical stunning devices is obviously that the user can keep his or hers distance from a threatening subject while being able to incapacitate a target subject; however, the disadvantages of this type of device are even more than what are typically attributed to hand-held stun-gun devices. The most common disadvantage of these devices, which applies to all hand-held devices, regardless of the method of operation or delivery of electrical-shock, is that these weapons can be removed or taken away from the original user by the subject target and used against him or her or another individual. The additional major disadvantages of this type of stun-gun is; that there is a limited number of "shots" or projectiles that can be used. Typically one to two shots before the "gun" has to be reloaded (which cannot be done during a fight), thereby limiting the time it can be used as well as the number of different targets the weapon can be used against—much more limiting than other types of hand-held devices; that the weapon has to be aimed precisely at an individual and then fired like a traditional gun or pistol, not an easy task for a lay person—especially if the target is moving, thereby requiring a much higher level of weapons training and proficiency and qualification by the user; that the firing of the device may miss the intended target subject (greater chance of occurring if target is moving) and strike another individual or other object causing unintended harm or damage, which could pose a serious problems in crowded public areas, or areas that contain flammable or explosive materials and in areas with extremely sensitive electronics like the inside of an aircraft cockpit; that the wires which connect the projected electrodes to the gun and power supply can be torn off the individual or broken if the subject attempts to flee, immediately stopping the flow of electrical energy (the high-voltage shock) to the target subject. These type of devices are also not similar in method of operation, use or material design to this patent application.

Currently, the market for the sale of non-lethal "stun-guns" is broad and has found many uses for military applications, law enforcement officials, criminal corrections officers, courtroom officials, security guards, civilian crowd control, personnel self-defense and protection, wild animal control and protection, domestic animal training and farm animal control.

The "Electrosurgical Glove" as described in U.S. Pat. No. 3,845,771 was designed for use in electrosurgical and/or electrocauterization procedures by a surgeon to pass high frequency electrical current to an electrically conductive surgical instrument grasped in the gloved hand and is not a weapon of any kind. The glove itself is not intended to deliver the electrical energy to the tissues directly but acts as an electrical bridge to another instrument while providing the same biological protection as a surgical glove between the patient and surgeon. This invention is not in the same field-of-use, nor is it similar in method of operation, use or material design to this patent application.

The "Self-Defense Apparatus" as described in U.S. Pat. No. 4,242,715 is a "strap-on" device as opposed to an actual article of apparel or clothing. It is a combination strap-on wrist and finger brace that is attached by two separate sets of straps, one for the wrist that has an integral power supply/high voltage generator, and one for a finger with two electrodes on the finger tip. Both sections are connected with externally exposed wires. The device is not an article of clothing; the whole device is located on one hand and can be very easily disabled by hitting or pulling on the wrist where the power supply is located; the device must be manually turned on for use and is always on or energized until turned it is turned off; and the device by-itself, is not stealthy or unnoticeable as a weapon when worn unless covered.

The "Shocking Device for Personal Protection" as described in U.S. Pat. No. 5,282,481 is also a "strap-on" type device as opposed to an actual article of apparel or clothing. It is also a combination strap-on device, with both wrist and forearm attachment point. The Forearm device has an integral power supply/high voltage generator with a master on/off switch, and the wrist unit has two electrodes and a unique activation mechanism. Both sections are connected with externally exposed wires. The device is not an article of clothing; the whole device is located on one hand and can be very easily disabled by hitting or pulling on the wrist or forearm where the components are located; and the device by-itself, is not stealthy or unnoticeable as a weapon when worn unless covered.

The "Electrified Glove" as described in U.S. Pat. No. 4,370,696 is a glove that can deliver an incapacitating electric shock. The device described is a single unit design, with the glove containing an internal power supply/high voltage generator wired directly to multiple electrodes which are in the palm but can be placed anywhere in the glove. The whole device is located on one hand and can be very easily disabled by hitting or pulling on the wrist where the power supply is located; it can be completely removed and still remain functioning, thereby allowing it to be used by the target subject against the original wearer or another person; and the device must be manually turned on to be used and is then always electrically energized at the electrode points until the unit is turned off.

The "Security Garment" as described in U.S. Pat. No. 4,485,426 is an article of clothing and has similar purpose; however, it differs in both material design and method of operation. The invention described two articles of apparel or "garments", a hand glove and a jacket, that can deliver an incapacitating electric shock. The devices described in this patent are of a single unit design, with both the glove and jacket containing an internal power supply/high voltage generator wired directly to multiple electrodes which can be located anywhere throughout the garment. The whole device is located in one single item of apparel and can be very easily disabled, in the case of the glove, by hitting or pulling on the wrist where the power supply is located; it can be completely removed, both glove or jacket, and still remain functioning, thereby allowing it to be used by the target subject against the original wearer or another person; and the device must be manually turned on to be used and is then always electrically energized at the electrode points until the unit is turned off.

SUMMARY OF THE INVENTION

This application describes a multi-component device which is capable of delivering a non-lethal, high-voltage electric shock which can incapacitate a person or animal that is worn as an article of ordinary apparel (clothing) by a person for use as a defensive or offensive weapon that is inconspicuous as a weapon and preferably has three separate components. The types of apparel used for this device may be regular clothing items such as pants, jackets, vests, shoes and gloves, all of which contain internal high voltage electrodes and wiring and one or more pressure sensitive activation switches. A separate control unit/power supply is attached to a belt or placed in a pocket which is connected to the clothing item by a separate multiconductor electrical wiring harness. The method of operation of the device is to incapacitate or control a person or other animal by delivery of a high-voltage electrical shock by means of physical contact between the article of clothing worn by a person and the target subject that is trying to be controlled or warded off. The delivery of the electrical charge is initiated by direct contact with the target. The electrodes of the device are preferably only energized when contact is made.

BRIEF DESCRIPTION OF THE DRAWINGS

FIG. 1 illustrates a basic glove embodiment of the subject invention.

FIG. 2 illustrates an example of the wiring of a glove embodiment.

FIG. 4 illustrates an embodiment of a novel wiring/insulation structure in accordance with the principles of the subject invention. FIG. 4A represents a cross-section. FIG. 4B represenst a perspective view with different layers exposed. FIG. 4C represents a side view with different layers exposed.

DETAILED DESCRIPTION OF THE PREFERRED EMBODIMENTS

Figure 1A:
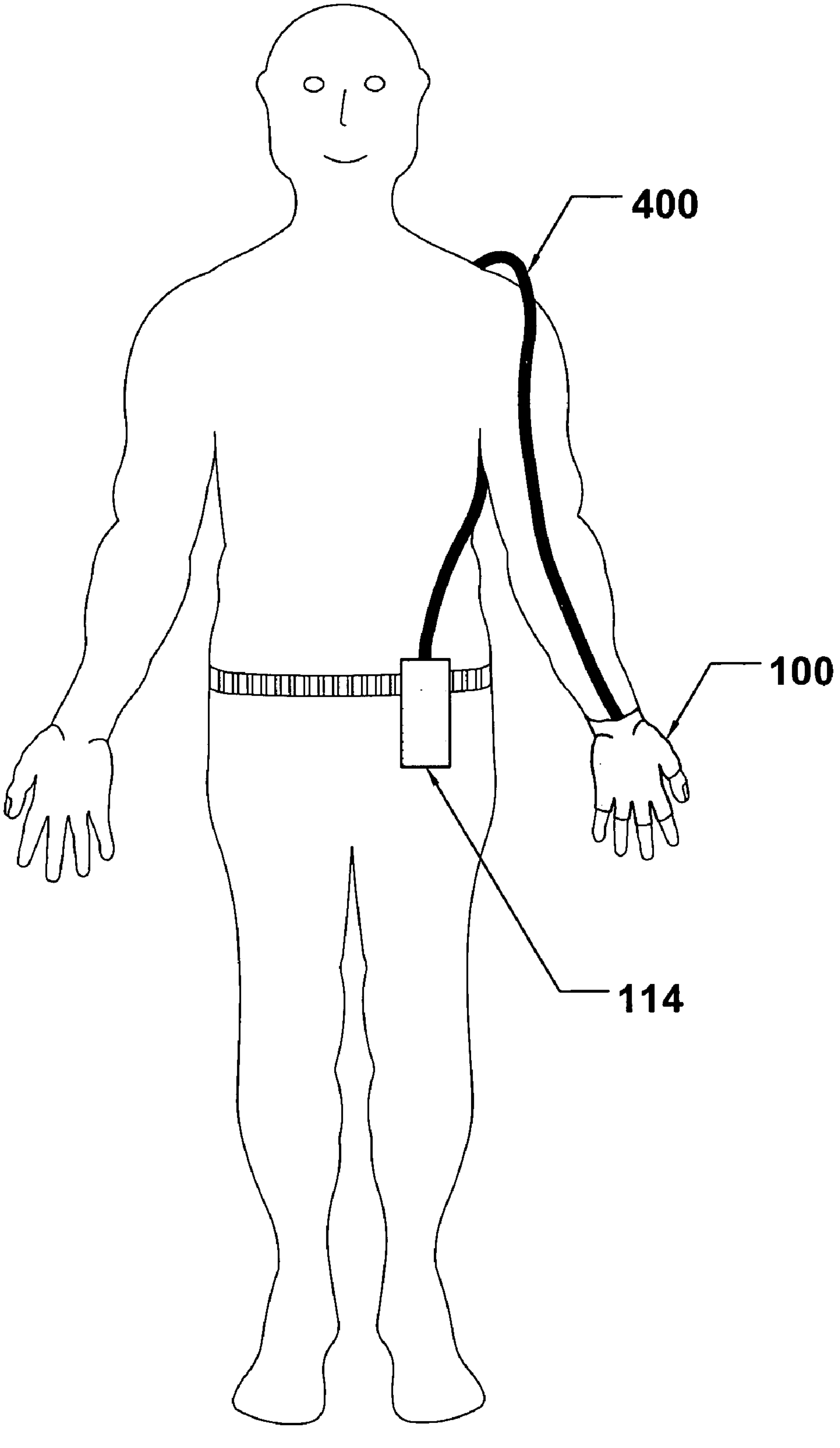
FIG. 1A illustrates the typical mode of wearing the glove embodiment.

The uniqueness of this invention is that traditional "electric stun-gun" weapons can now be replaced by "electric-stun apparel" weapons, which for the first time, allows a user of this device to wear the weapon as a regular article of clothing that is not obviously apparent to the general public in its purpose as a weapon (offensive or defense). In a sense, the person becomes the weapon instead of holding a weapon. The usage of electric-stunning apparel can provide a level of concealment or stealth that has not been previously available to these type of weapons. It also provides a new level of safety to the user in that this apparel weapon cannot be turned against him or herself or used on other person other than the intended target unlike traditional hand-held stun-guns, since the apparel weapon is physically attached to ones body. Should the article of clothing be torn off the wearer, it would be disabled and unusable because the control unit is separately located on the individual, typically mounted on the belt, and the separate wires connecting the two components would be disconnected. Additionally this design of electric-stun apparel weapon is capable of instant and unplanned deployment and discharge of stunning electrical voltages on surprise attackers without requiring the user or wearer to be prepared and ready to use the weapon. Once the device is armed by a master switch, the electrodes will only discharge by physical contact and do not remain energized unlike many other designs. It also be can used repeatedly and continuously until an attacker or target subject is subdued or controlled.

The overall design of this electric-stunning apparel is a combination of several separate components combined in such a way as to incorporate multiple electrical discharge electrodes and one or more pressure sensitive activation switches connected in parallel, at strategic, as well as ergonomic, locations on select items of personal clothing. The electrodes and switches are then connected via a separate wiring harness containing insulated high-voltage wires and control signal wires to a separately placed control unit which contains a power source and a high-voltage generator circuit and electrical connectors for connecting the wiring harness to it. The control switch(s) are a pressure-sensitive momentary contact switch that are also placed into the article of clothing at strategic locations which will allow instant activation and discharge of the high-voltage electric shock at the electrodes when the slightest contact pressure is applied either by the user or the attacker. The location of the switch or switches in each article of clothing are placed in such a way as to allow the user/wearer complete control of the activation of the device and prevent any unwanted discharges. These components can be assembled in most clothing items and have been shown to be most useful in vests, jackets, coats, shoes and gloves for both offensive and defensive uses. In each of these items of apparel, the separate wiring harness which connects both the electrodes and the activation switch(s) to the control unit, are routed through sewn channels within the item of apparel, between stitched seams, or placed within the linings of coats and vests and can be removed if required for laundering and repair.

Figure 1B:
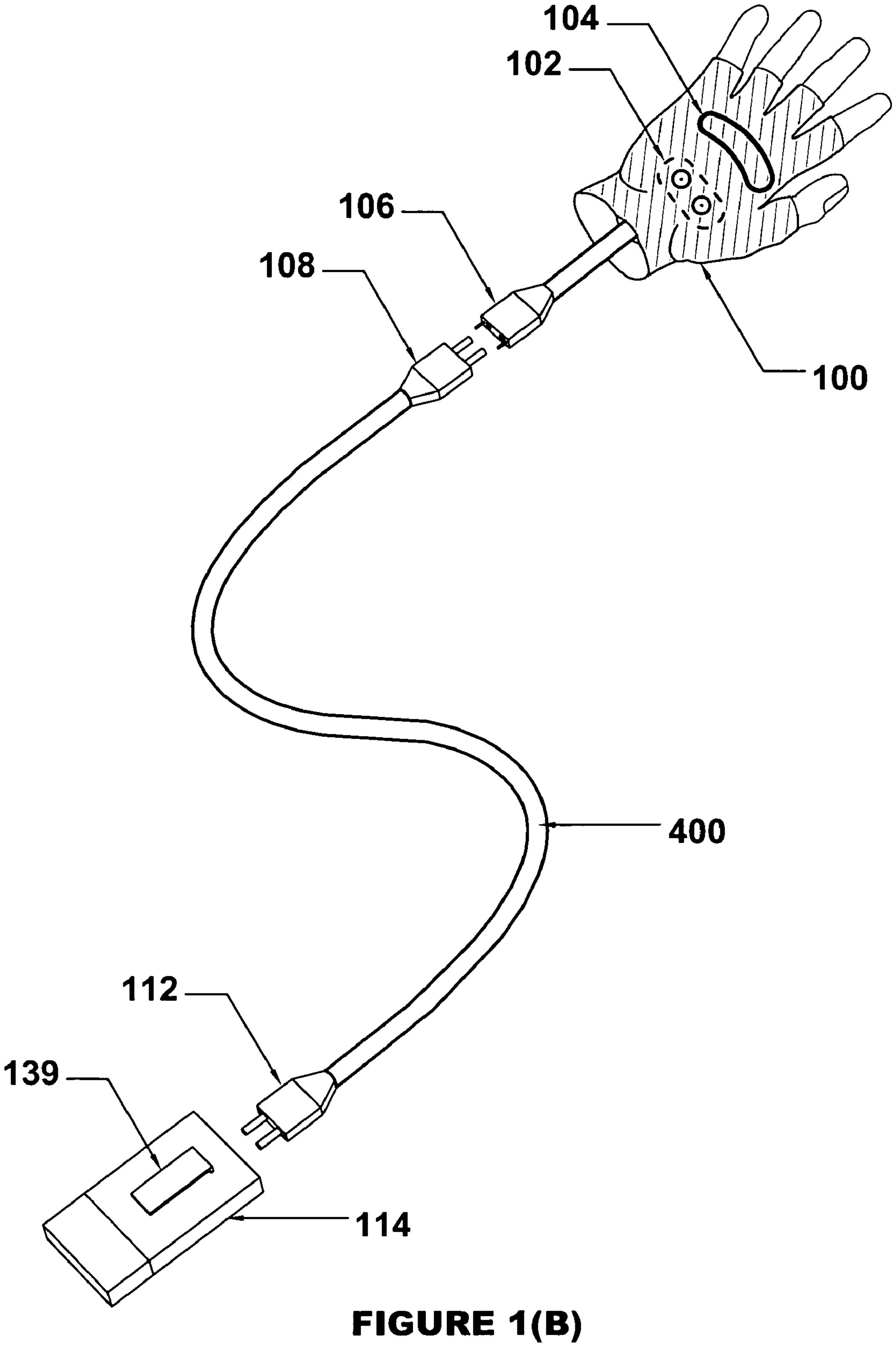
FIG. 1B shows the interconnectivity of the glove with the power supply.

Turning now to the FIGS. 1 and 2, a preferred mode of this invention is its use as a full or half covering hand glove 100. The hand glove 100 can be constructed out of any natural and/or synthetic fabric and polymers, with internal wiring (see FIG. 2C) for at least two or more electrodes 102*a*, 102*b* for the discharge of a high-voltage electric-shock. The electrodes 102*a* and 102*b* can be placed on any two or more finger-tips, or can be placed inside of the palm of the hand to allow for discharge upon closing or grasping (making a fist) of an object. The first two electrodes are typically placed between one to two inches apart; however, they can be placed at any distance apart, but preferably greater than about one-half inch (0.5"), including spread across two gloves, with one electrode in each hand glove. Those skilled in the art will properly adjust the optimal distance of the electrodes to facilitate the proper arc of high voltage current. Extending out from the bottom region of the glove embodiment 100 is a first connector 106 which plugs into an opposite gender second connector 108 at the end of a wiring harness 400. At the opposite end of the wiring harness 400 is a third connector 112, which plugs into a control unit 114. The control unit 114 is preferably equipped with a clip 139 for attachment to piece of clothing of the user.

Figure 2A:
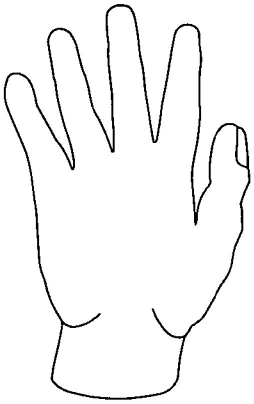
FIG. 2A shows a hand and FIG. 2B shows the glove embodiment on the hand.
Figure 2B:
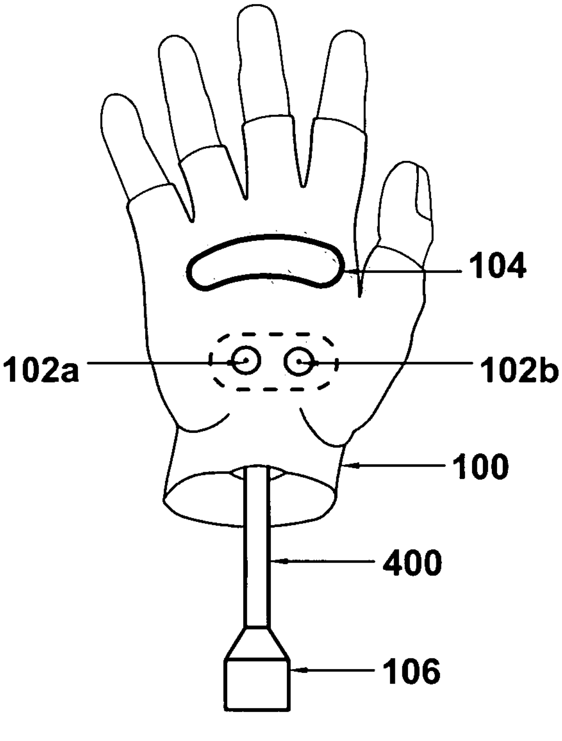
Figure 2C:
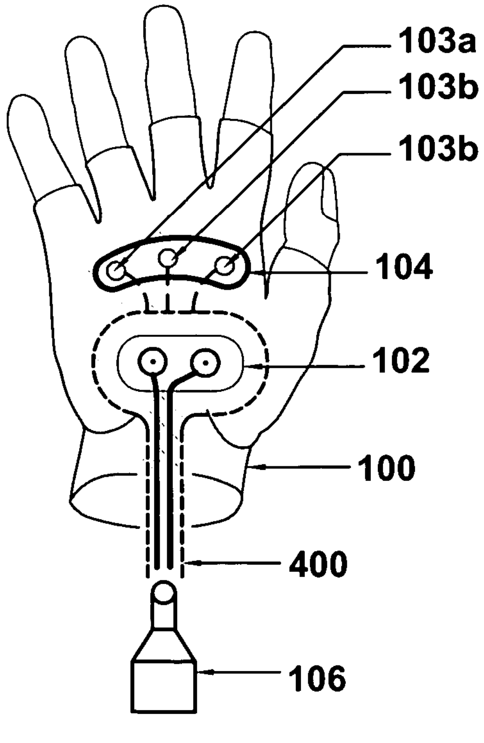
FIG. 2C depicts the underlying structures of the glove embodiment.
Figure 2D:
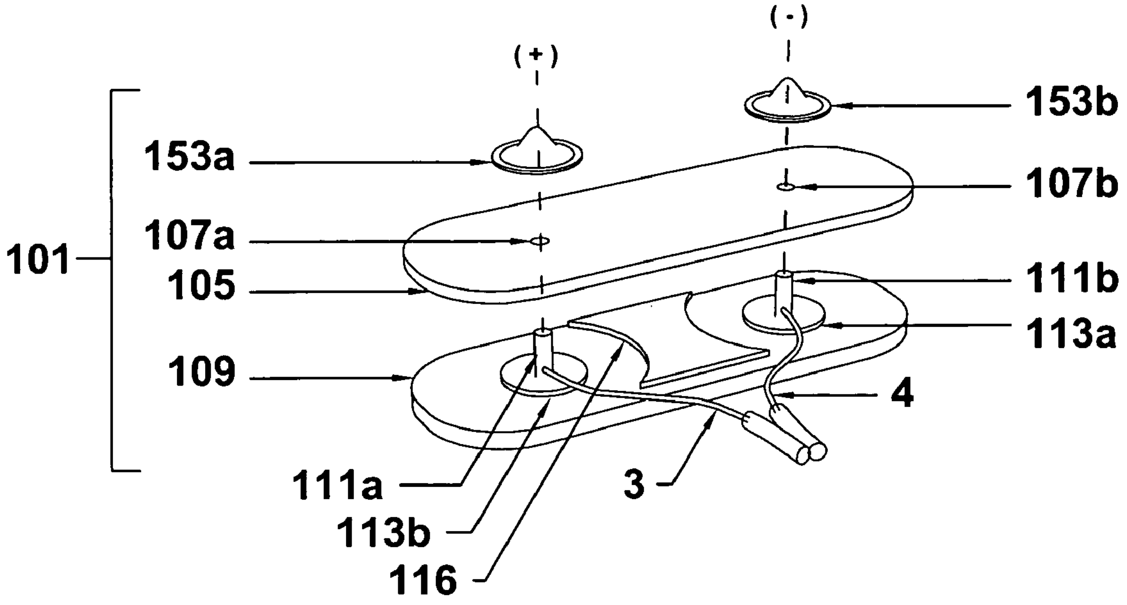
FIG. 2D is a side perspective view of the electrode structures of the glove embodiment.
Figure 2E:
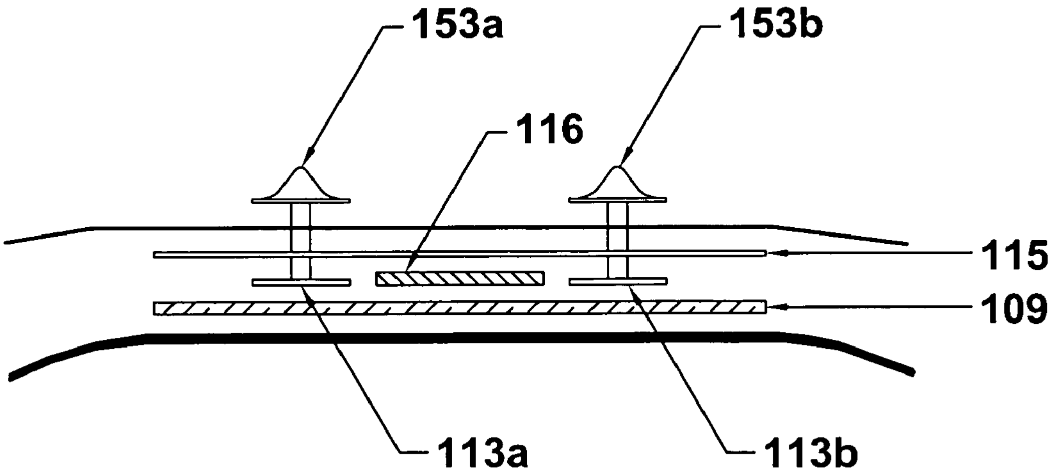
FIG. 2E is a side view of the electrode structures of the glove embodiment.

FIG. 2D shows a close-up disassembled view of the electrode apparatus 101. An important feature of the electrode apparatus 101 is that it is designed such that the user does not electrocute herself. Unless the electrode apparatus 101 is properly insulated, any protective value of the non-lethal electric apparel embodiment could be diminished by the the user being incapacitated by undesirous seepage of high voltage toward the user. Accordingly, as shown in FIG. 2D careful separation of the wires 1,2,3, and 4 and the electrodes from the user is achieved. The electrode apparatus comprises a protective base 109 onto which to posts 111*a*, 111*b* comprising bottom portions 113*a*, 113*b*, respectively, are attached or integrated. Wires 3 and 4 are attached to said posts. Disposed between said posts 111*a*, 111*b* is a spacer 116, preferably comprised of silicon or teflon, or some other like material comprising requisite insulating characteristics. Over said posts 111*a*, 111*b*, spacer 116, and protective base 109 is disposed a top protective cover 105, which slides over posts at holes 107*a*, 107*b*. The fabric material A (see FIG. 2E), is disposed over the electrode apparatus 101, except that posts 111*a* and 111*b* pass through the fabric A. Post caps 153*a* and 153*b* are positioned on top of posts 111*a* and 111*b*.

As shown in FIGS. 2B and 2C, the electrodes 102*a* and 102*b* and wires 1,2,3,4 are sewn into the fabric of the glove 100 and are not externally exposed where they can be grabbed or pulled apart. At least one pressure-sensitive activation switch 103(*a–c*) which causes the discharge of the high voltage electric-shock when touched is also installed into the glove and covered by a layer of similar fabric 104 so not to be identifiable. There can be more than one activation switch, which are connected in parallel and placed at different strategic points on the article of clothing to insure activation by contact from any angle or point of contact. There is an external electrical connector 106 at the wrist end of the glove (cuff) to which all the internal wires 1,2,3,4 inside the glove attach to and provides a removable connection for the wires 1,2,3,4 so that the glove may be removed at any time. This connector 106 plugs into a similar opposite gender connector 108 (see FIG. 1) attached to a separate multiconductor wiring harness 400 which consists of four or more of wires, of no specific length, made up of metallic electrical conductors covered individually by polymeric or plastic insulation, that preferably has the same electrical connectors on both ends of the harness to allow electrical connection between the hand glove and the control (power) unit. This wiring harness 400 can carry the high-voltage electrical current needed to deliver an electrical shock and the control signal from the activation switch 103 inside the glove. The separate wiring harness 400 is routed through a sewn channel within a shirt or through the internal lining of a jacket and terminates at the location of where the control unit is located on the person (see FIG. 1A). The wiring harness 400 can be disconnected at either end.

Figure 3:
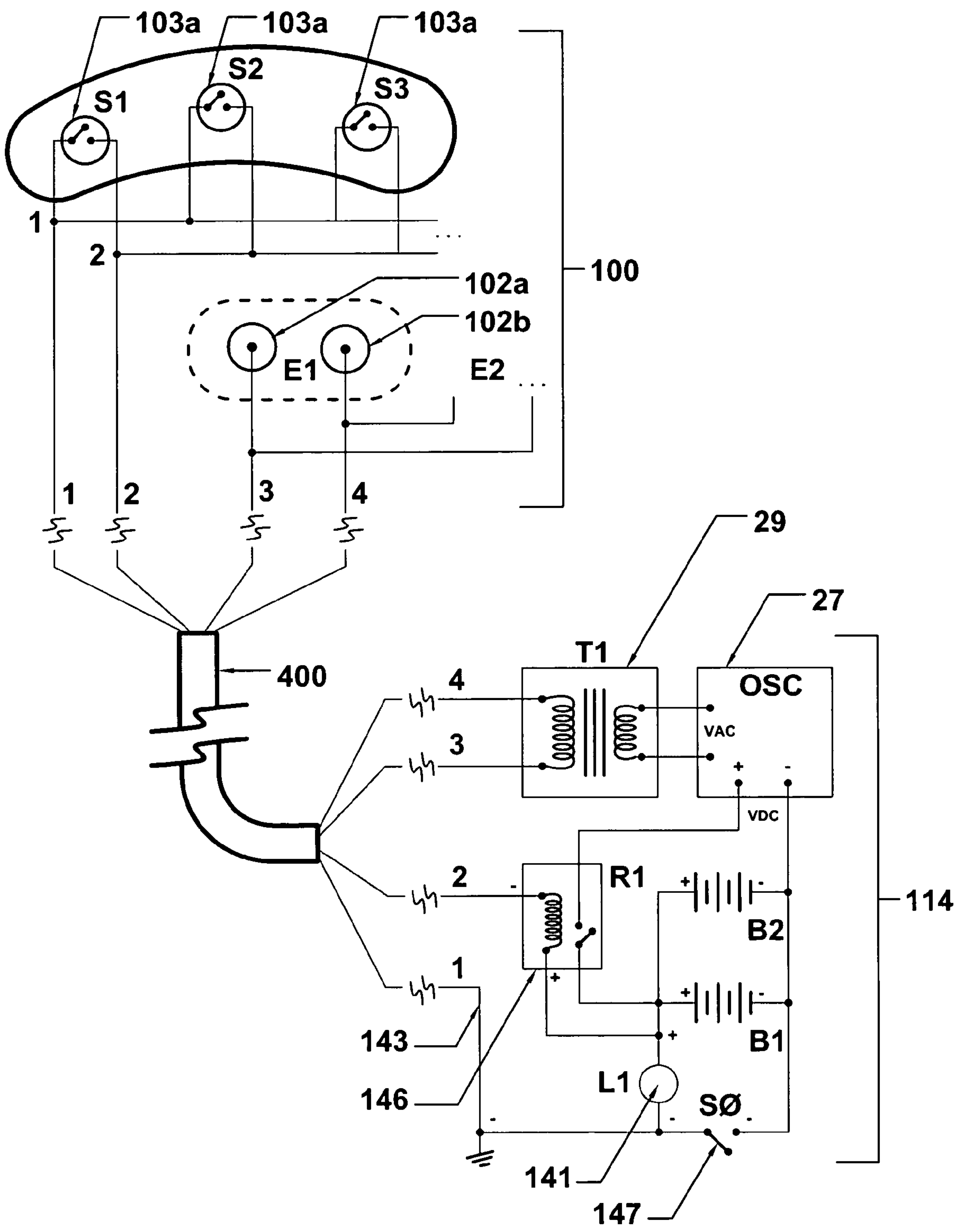
FIG. 3 illustrates a schematic of the wiring of a glove embodiment.

FIG. 3 relates to a schematic of the electrical circuitry of the glove embodiment 100, wiring harness 400, and control unit 114. Shown at the upper portion of FIG. 3 is the switches 103*a,b*, and *c* which are connected to wires 1 and 2 and run through the wiring harness 400 to the control unit 114. Wires 3 and 4 run from the electrodes 102*a* and 102*b* through the wiring harness to the control unit. Upon triggering of the switch 147, light 141 is illuminated, and the system is ready for activation. When pressure is applied to one or more of switches 103*a, b*, or *c* the circuit formed by wires 1 and 2 is closed, which in turn activates switch 146. Closing of switch 49 closes the circuit which in turn allows current to flow from the batteries B1 and B2 to the oscillator 27. Voltage is then amplified by transformer 29 and high voltage current then flows through wires 3 and 4 to electrodes 102*a* and 102*b* creating an electrical arc therein between. FIG. 6 is a photograph of the inside of a control unit embodiment.

The control unit (power supply) 114, of no specific size and shape, that can be mounted anywhere on or about a person which can include a fastening device such as a belt-clip 139 or velcro strips or straps and is simply placed inside a pants pocket, a jacket pocket or mounted directly to a belt. As shown in the schematic in FIG. 3, the control unit 114 contains an internal battery source 141 to provide electrical power, an electrical circuit and components 143 that can generate a high-voltage, low amperage electrical shock from 1,000 to 800,000 Volts AC or DC, a main power switch 147 to turn the power supply on and off which serves as a master arming switch.

As discussed throughout, one advantage of the subject non-lethal electrical weapon is its unobtrusiveness. One feature of the wiring harness 400 which minimizes the obtrusiveness of the weapon is its relatively small diameter. Using conventional wires within the wiring harness such wires would need to be inches thick to accommodate the substantial voltage which is passing through the wiring harness. This is because the the current would short circuit or arc along the length of the wiring rendering the weapon useless, and possibly dangerous to the user. The inventors have developed a novel wire insulation structure which can handle the extremely large voltages needed without requiring large cumbersome wires to accommodate such voltages. The novel wiring structure can accommodate these large voltages even at fractions of an inch in diameter. Turning to FIG. 4, the multi-conductor cable 400 is a combination of four or more individual single electrical conductors 421, 422,443, 444 which are specifically insulated and combined in such a way as to allow the transmission of low-current, high-voltage signals (up to 800,000 volts) in a very small diameter cable, typically between 5/16" OD to ½" OD, and not cause electrical energy leakage between the individual conductors nor to a person whom comes in contact with the cable 400.

The multi-conductor cable 400 is made up of at least 2-pairs of individually insulated electrical conducting wires, a high-voltage 430 pair and a low-voltage pair 420, but may contain more duplicate pairs should multiple pieces of electrical stunning apparel be worn by a single user.

One conductive wire pair 430 is used to carry the high-voltage signals. This pair consists of two individual multi-stranded, metallic conductors 443, 444, typically made out of copper, aluminum, steel, or any other low resistance metallic wire. Single strand wire has and can be used; however, multi-stranded versions provide for more flexibility and breakage resistance. The wire size (gauge) of these conductors 443, 444 can be from 16 AWG down to 36 AWG, with the preferred size to be around 24 AWG to provide sufficient strength (breakage resistance) and yet minimize size, since signal current-carrying capacity is not a limiting factor. These conductors 443, 444 are individually dual-layer insulated and are first insulated with a Silicone-polymer layer 440 and then secondarily covered by a TEFLON (PTFE or FEP) polymer outer layer 430. The dielectric (insulation) properties with this particular combination of insulators within the wiring harness is what prevents the short-circuit, grounding or leakage of the high-voltage signals.

The second conductive wire pair 420, used to carry the low-voltage control or activation signal, also consists of two individual single or multi-stranded, metallic conductors 421, 422, typically made out of copper, aluminum, steel, or any other low resistance metallic wire. Single strand wire has and can be used; however, multi-stranded versions provide for more flexibility and breakage resistance. The wire size (gauge) of these conductors 421, 422 can be from 20 AWG down to 36 AWG, with the preferred size to be around 24 AWG to provide sufficient strength (breakage resistance) and yet minimize size, since signal current-carrying capacity is not a limiting factor. These conductors 421, 422 are insulated with a non-specific single plastic layer 420, typically PVC or Vinyl plastic, and can be color coded as needed.

The two sets of wire-pairs 420 & 430 are then combined together inside a 2-layer outer insulating jacket or covering. The first layer 410 is a TEFLON-FEP polymer covering followed by a final outer Silicone, PVC or Vinyl polymer layer 400, to provide water and abrasion resistance which can be of any color but typically black.

Figure 5:
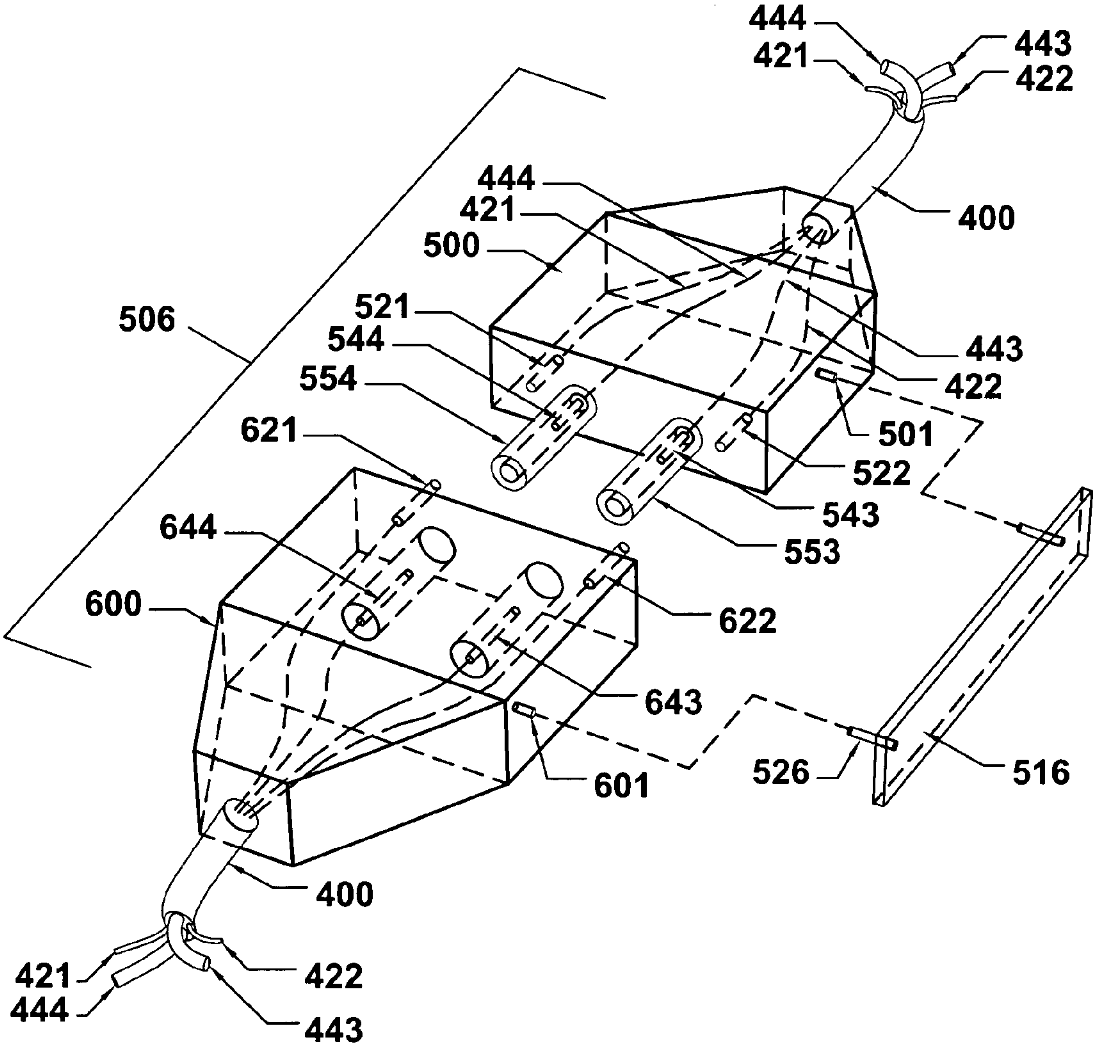
FIG. 5 illustrates an example of the interconnection plug of an embodiment for actuating electrical shock on an individual and the wiring from a power supply.

Turning to FIG. 5, the wiring harness consists of a uniquely designed electrical multiconductor cable 400 with connectors 500, 600, 506 that is used to deliver both high-voltage and control signals between the glove 200 or other apparel items and the power supply unit 300. At both ends of the wiring-harness 400 is a removable connector assembly 506, consisting of a male 500 and female 600 removable connector. This assembly 506 is made from pure, solid TEFLON-PTFE polymer. There are four individual, internal metallic connector pins, made typically from copper, but can be made from any low-resistance metals, within both the male 500 and female 600 connectors.

The high-voltage conductors 443, 444 attached to the male wiring-harness connector 500 are connected to the two center male-pins 543, 544 respectively. These male connector pins 543, 544 are separated by a minimum ¾" center-to-center spacing with no other metallic components between them. These male-pins 543, 544 are also insulated with a TEFLON-PTFE outer barrel 553, 554 respectively which extends past the ends of the metallic male connector-pins by at least ½" to provide additional insulation and helps to prevent possible short-circuiting when the connector is un-plugged or removed from the female 600 wiring-harness connector. The low-voltage control signal conductors 421, 422 are internally attached to female connector-pins 521, 522 respectively and are located on the outside and next to the high-voltage connectors. This outside positioning of the control signal connector-pins 521, 522 prevents the possibility of the high-voltage signal from "bridging" or jumping from conductor-to-conductor to short-circuit between the two high-voltage connector-pins 543, 544.

Respectively, the high-voltage conductors 443, 444 attached to the female wiring-harness connector 600 are internally connected to the two center female-pins 643, 644) respectively. These female connector-pins 643, 644 are separated by a minimum ¾" center-to-center spacing with no other metallic components between them. These female-pins 643, 644 are contained within the TEFLON-PTFE body of the female 600 wiring-harness connector. The low voltage control signal conductors 421, 422 are attached to two external male connector-pins 621, 622, respectively, and are located on the outside and next to the high-voltage connectors. This outside positioning of the control signal connector-pins 621, 622 prevents the possibility of the high-voltage signal from "bridging" or jumping from conductor-to-conductor to short-circuit between the two high-voltage internal connector-pins 643, 644.

Both the male 500 and female 600 wiring-harness connector assembly 506, when plugged together, is held together by a side plastic retaining-clip 516 that has two plastic barbed-pins 526 that fit snugly into two holes, one each in the male 501 and female 601 wiring-harness connector.

Representative fabrics and materials of construction which can be employed according to this invention include, but are not limited to; all fabrics normally used in the production of ordinary clothing apparel, both natural and synthetic, and various electrically insulating polymers both natural and synthetic of any color and texture. These materials may be employed separately or in various combinations according to this invention. The method of attachment and placement of internal wires and the wiring harness are not specific and can be routed or placed in any part of any piece of clothing for functional, ergonomic or personnel comfort reasons.

Having generally described the invention, and the preferred embodiments thereof, the following examples are provided to extend the written description of the invention and to exemplify the best mode of carrying out this invention. However, it will be appreciated that the scope of this invention should not be considered to be limited to the specifics of the examples, which are provided merely for illustrative purposes.

EXAMPLE 1

One embodiment relates to use of this invention by flight crew personnel in commercial airline security and safety for the control of passengers that become disruptive or persons who plan to take control of an aircraft for purposes of hijacking or other terrorism activities.

EXAMPLE 2

Another embodiment relates to use of this invention to as a personal defense weapon worn by a person to protect themselves from an attacker and thwart off a physical battery, rape, or robbery attempt by a perpetrator of such a crime.

EXAMPLE 3A

A further embodiment pertains to use of this invention by law enforcement personnel in the control of prisoners that attack correction officers and subjects that violently resist arrest.

EXAMPLE 4

An additional embodiment relates to use of this invention by animal control officers, animal handlers and civilians for the use of warding off animal attacks and controlling animals.

From the foregoing, it will be seen that this invention is one well adapted to attain all of the ends and objects hereinabove set forth, together with other advantages which would be suggested to those skilled in the art based on the present disclosure and which are inherent to the process disclosed herein. It will be understood that certain features and sub-combinations are of utility and may be employed without reference to other features and sub-combinations. This is contemplated by, and is within the scope of the claims. As many possible embodiments may be made of the invention without departing from the scope thereof, it is to be understood that all matter herein set forth or shown in the accompanying drawings is to be interpreted as illustrative, and not in a limiting sense. The teachings of all references cited herein are incorporated herein in their entirety to the extent not inconsistent with the teachings herein.

REFERENCES CITED

U.S. Patent Documents (25):

| | | | |
|---|---|---|---|
| 3,523,538 | Aug. 11, 1970 | Shimizu | "Arrest Device" |
| 3,803,463 | Apr. 09, 1974 | Cover | "Weapon for Immobilization and Capture" |
| 3,845,771 | Nov. 05, 1974 | Vise | "Electrosurgical Glove" |
| 3,885,733 | May 27, 1975 | Klebold et al. | "New Electric Prod" |
| 3,917,268 | Nov. 04, 1975 | Tingey et al. | "Spark Gap Type Electric Shock- . . . " |
| 3,998,459 | Dec. 21, 1976 | Henderson et al. | "Electrical Shocking Device" |
| 4,006,390 | Feb. 01, 1977 | Levine | "Pocket-sized Non-lethal Electrical Weapon" |
| 4,093,969 | Jun. 06, 1978 | Maynor, Jr. | "Electric Umbrella" |
| 4,120,305 | Oct. 17, 1978 | Rhoads et al. | "System for Administering an Electric . . . " |
| 4,162,515 | Jul. 24, 1979 | Henderson et al. | "Electrical Shocking Device with audible . . . " |
| 4,242,715 | Dec. 30, 1980 | Laird | "Self-Defense Apparatus" |
| 4,253,132 | Feb. 24, 1981 | Cover | "Power Supply for Weapon for . . . " |
| 4,337,496 | Jun. 29, 1982 | Laird | "Self defense Apparatus" |
| 4,370,696 | Jan. 25, 1983 | Darrell | "Electrified Glove" |

-continued

| U.S. Patent Documents (25): | | | |
|---|---|---|---|
| 4,424,932 | Jan. 10, 1984 | Allen | "Electric Shock Prod" |
| 4,485,426 | Nov. 27, 1984 | Kerls | "Security Garment" |
| 4,688,140 | Aug. 18, 1987 | Hammes | "Electronic Defensive Weapon" |
| 4,943,885 | Jul. 24, 1990 | Willoughby et al | "Remotely Activated, Non-obvious . . . " |
| 5,153,365 | Oct. 06, 1992 | Chang | "Belt-type Electric Shock Device" |
| 5,282,332 | Feb. 01, 1994 | Philips | "Stun Gun" |
| 5,282,481 | Feb. 01, 1994 | Ziemer | "Shocking Device for Personal Protection" |
| 5,388,603 | Feb. 14, 1995 | Bauer et al. | "Electronic Stunning Truncheon and . . . " |
| 5,654,867 | Aug. 05, 1997 | Murray | "Immobilization Weapon" |
| 5,698,815 | Dec. 16, 1997 | Ragner | "Stun Bullets" |
| 5,831,199 | Nov. 03, 1998 | McNutty, Jr. et al. | "Weapon for Immobilization and Capture" |

The teachings of all references cited herein are incorporated herein in their entirety to the extent they are not inconsistent with the teachings of the subject application.

We claim:

1. A multi-component device capable of delivering a non-lethal electrical shock to a human or any other animal that is the worn apparel of a person, which comprises:

(a) an article of apparel constructed out of any natural and/or synthetic fabric and polymers, said article of apparel comprising wiring for two or more electrodes for the discharge of a high-voltage electric-shock, at least one pressure-sensitive momentary activation switch, which when pressed creates an activation signal causing an instant discharge of a high voltage electric shock from said electrodes, and an external electrical connector to which all wiring from said electrodes and said at least one activation switch attaches, wherein said at least one pressure-sensitive momentary activation switch comprises multiple pressure-sensitive momentary activation switches connected in parallel such that any one or more may separately energize the electrodes upon contact, (b) a multiconductor wiring harness comprising four or more wires to allow electrical connection between said article of apparel and a control unit, a cable comprising (i) at least two high voltage wires each comprising an internal metal conductor, a first insulation layer surrounding said internal metal conductor; and a second insulation layer surrounding said first insulation layer; wherein said first insulation layer is comprised of a silicone and the second insulation layer is comprised of PTFE; wherein said at least two high voltage wires have a diameter of less than one inch; and wherein said at least two high voltage wires can abut each other without short-circuiting when carrying a voltage of more than 100,000 volts and (ii) at least two low voltage wires and wherein said wiring harness carries the high-voltage electrical current needed to deliver the electrical shock and activation signal from the at least one activation switch;

(c) a control unit that can be mounted about a person; said control unit comprising an internal battery source to provide electrical power, an electrical circuit and components designed to generate a high-voltage electrical shock between 1,000 and 800,000 Volts AC, a master arming power switch to turn the power supply on and off, an external electrical connector to allow said wiring harness to be connected between said article of apparel and said control unit, and said electrical circuit configured such that the control unit receives the activation control signal from the article of apparel and outputs the high-voltage electric shock back to the article of apparel for discharge; and (d) a wiring harness connector assembly to removably connect said article of apparel with said control unit, said assembly comprising (i) a male wiring harness connector comprising at least two center male pins connected to at least two high voltage wires, wherein said center male pins are separated by at least 0.75 inch center-to-center spacing and having no other metallic components between them, at least two outer insulation barrels encompassing said at least two center male pins and extending at least 0.5 inches past the length of the respective center male pins and (ii) a female wiring harness connector comprising at least two female center pins connected to at least two high voltage wires, wherein said at least two female center pins are separated by at least 0.75 inch center-to-center spacing and having no other metallic components between them and arranged so as to make connection with said male center pins upon engagement of said male and female wiring harness connectors.

2. The device of claim number 1 wherein said article of apparel is a full-covering hand glove.

3. The device of claim number 1 wherein said article of apparel is a partial or half-covering hand glove having exposed finger tips.

4. The device of claim number 1 wherein said article of apparel is a vest that can be worn by itself or under a jacket or coat.

5. The device of claim number 1 wherein said article of apparel is a coat or jacket.

6. The device of claim number 1 wherein said article of apparel is a pair of shoes or boots.

7. The device of claim number 1 wherein said article of apparel is a long-sleeve shirt.

8. The device of claim number 1 wherein said article of apparel is a pair of long pants.

9. The device of claim number 1 wherein said wiring harness is fully removable and is flexible such that it may be routed along contours on a persons body to connect said article of apparel and said control unit.

10. The device of claim 1, wherein said control unit comprises a fastener, wherein said fastener is a belt-clip, hook and loop fabric or straps.

11. The method of claim 1 wherein said electrical circuit and components comprises at least one oscillator and at least one transformer.

12. A method of subduing an attacker comprising wearing a device according to claim 1,contacting said attacker with said article of apparel comprising said at least one activation switch and two or more electrodes, such that activation switches are depressed and an electrical shock is applied to said attacker.

* * * * *